US006963681B2

(12) United States Patent
Mao et al.

(10) Patent No.: US 6,963,681 B2
(45) Date of Patent: Nov. 8, 2005

(54) AUTOMATIC RAMAN GAIN CONTROL

(75) Inventors: Erji Mao, Campbell, CA (US); Stuart MacCormack, Mountain View, CA (US); Greg Roth, Santa Ana, CA (US); Steven Sanders, Belmont, CA (US)

(73) Assignee: JDS Uniphase Corporation, San Jose, CA (US)

(*) Notice: Subject to any disclaimer, the term of this patent is extended or adjusted under 35 U.S.C. 154(b) by 178 days.

(21) Appl. No.: 10/611,784

(22) Filed: Jun. 30, 2003

(65) Prior Publication Data

US 2004/0052453 A1 Mar. 18, 2004

Related U.S. Application Data

(60) Provisional application No. 60/392,298, filed on Jul. 1, 2002.

(51) Int. Cl.[7] .......... G02B 6/26; G02B 6/42

(52) U.S. Cl. .......... 385/27; 359/334; 359/341.1; 359/341.41; 359/341.42

(58) Field of Search .......... 359/334, 337, 359/337.11, 341.1, 341.4, 341.42, 341.41; 385/27

(56) References Cited

U.S. PATENT DOCUMENTS

| | | | | |
|---|---|---|---|---|
| 6,542,287 | B1 | 4/2003 | Ye et al. | 359/334 |
| 6,624,926 | B1 * | 9/2003 | Hayashi et al. | 359/334 |
| 6,687,049 | B1 * | 2/2004 | Sulhoff et al. | 359/341.4 |
| 6,690,505 | B1 * | 2/2004 | Ye | 359/337 |
| 6,697,187 | B2 * | 2/2004 | Seydnejad et al. | 359/334 |
| 6,704,136 | B2 * | 3/2004 | Neuhauser | 359/334 |
| 6,741,389 | B2 * | 5/2004 | Kumasako et al. | 359/334 |
| 6,785,042 | B1 * | 8/2004 | Onaka et al. | 359/334 |

* cited by examiner

*Primary Examiner*—Akm Enayet Ullah
*Assistant Examiner*—Daniel Petkovsek
(74) *Attorney, Agent, or Firm*—Allen, Dyer, Doppelt, Milbrath & Gilchrist, P.A.

(57) ABSTRACT

The invention relates to a method for automatic dynamic gain control in optical Raman amplifiers and an optical Raman amplifier adapted for the same. The present invention has found that in multiple pump Raman amplifiers a substantially linear relationship exists between total amplified signal power and pump power for each of different wavelength pumps, in order to maintain an original gain profile and gain levels for an optical link with a fully loaded channel configuration, in response to dropped channels. In accordance with the method, and an amplifier programmed to practice the method, a set of pump power values and signal level values required to maintain the characterized gain profile and gain levels for a plurality of channel loading configurations are pre-established for the each pump wavelength. A linear function from each set of pre-established values is derived for each pump wavelength. Advantageously, a single photodiode can replace a costly and complex channel monitor for providing signal responsive pump control.

16 Claims, 8 Drawing Sheets

AUTOMATIC RAMAN GAIN CONTROL

CROSS-REFERENCE TO RELATED APPLICATIONS

This application claims priority from U.S. provisional application No. 60/392,298 filed Jul. 1, 2002.

MICROFICHE APPENDIX

Not Applicable.

TECHNICAL FIELD

The present application relates to a method for automatic dynamic gain control in optical Raman amplifiers and an optical Raman amplifier adapted for the same.

BACKGROUND OF THE INVENTION

Optical Raman amplifiers are particularly attractive for use in optical communications networks for their broad wavelength range. In wavelength division multiplexed (WDM) networks, this is particularly important. The Raman gain spectrum is broadened by providing pump energy at a plurality of different wavelengths. In typical Raman amplifiers, channel monitors are provided to monitor the individual channel gain across the transmission spectrum. Information from the channel monitor is provided to a controller to regulate the pump power of the plurality of pump sources at different wavelengths.

A Raman pumped fiber amplifier with a constant pump level will not produce a well-controlled output signal in response to large variations in the input signal level. When the input power suddenly increases due to the addition of new channels, the Raman pump is depleted, which causes the output power per channel at the end of the pumped transmission fiber to decrease more than desired. When the input power suddenly decreases because channels have been dropped and the Raman pump level is not lowered accordingly, the Raman gain becomes too high and the output power per channel at the end of the pumped transmission fiber increases more than desired. A channel monitor provides gain information which identifies which pump source power to regulate.

Providing a channel monitor for each Raman stage is quite costly in both equipment and maintenance. It is desired to reduce the cost and complexity of such systems by eliminating the need for channel monitors at every stage. By simplifying the pump control algorithm, the pump control can also be significantly accelerated.

Accordingly, a simplified method for automatic dynamic gain control in optical Raman amplifiers remains highly desirable.

SUMMARY OF THE INVENTION

The present invention has found that in multiple pump Raman amplifiers a nearly linear relationship exists between total amplified signal power and pump power for each of different wavelength pumps in order to maintain original gain levels for an optical link with a fully loaded channel configuration. It is surprising that this relationship is maintained in a multiple pump system.

Accordingly, an object of the present invention is to provide an optical Raman amplifier for providing dynamic gain control of an amplified signal comprising an optical waveguide for transmitting a plurality of optical signals on channels at different wavelengths;

at least a first and a second Raman pump source having different wavelengths optically coupled to the optical waveguide for providing variable optical pump power to produce Raman gain for the optical signals;

an optical power monitor for measuring optical power of the amplified signals for monitoring changes in channel loading;

a pump controller for comparing the optical power of the amplified signal to stored values correlating pump power levels of the first and second pump sources to total amplified signal power in accordance with a pre-established Raman gain profile and gain level of the Raman amplifier in a fully loaded channel configuration, and for modifying the pump power of the first or second pump sources to correspond to a stored value in response to changes in channel loading.

Thus an aspect of the present invention provides a method for providing dynamic gain control of an optical Raman amplifier in an optical communications link comprising an optical waveguide for transmitting optical signals on channels at different wavelengths, the optical Raman amplifier including at least a first optical pump source of a first pump wavelength and a second optical pump source of a second different wavelength, said pumps optically coupled to provide optical energy to the optical waveguide of sufficient pump powers to cause stimulated Raman scattering for amplifying optical signals, and a pump controller for controlling the pump powers of the at least first and second optical pumps in response to data from an optical signal detector, comprising the steps of:

a) characterizing a gain profile and gain level of the Raman amplifier when the channels of the communications link are fully loaded, over a wavelength spectrum at least as great as a desired transmission channel spectrum;

b) pre-establishing a set of pump power values and signal level values required to maintain the characterized gain profile and gain levels for a plurality of channel loading configurations for the first pump wavelength;

c) deriving a linear function from the set of pre-established values for the first pump wavelength;

d) pre-establishing a set of pump power values and signal level values required to maintain the characterized gain profile and gain levels for a plurality of channel loading configurations for the second pump wavelength;

e) deriving a linear function from the set of pre-established values for the second pump wavelength;

f) tapping a portion of an amplified signal;

g) detecting a total amplified signal power from the tapped portion of the amplified signal;

h) calculating the required first and second pump powers to maintain the characterized gain profile and gain level as a unique solution from the linear functions; and i) providing the calculated pump powers for the first and second pumps to a pump controller for comparing the calculated pump powers to current pump powers and varying the pump powers if necessary.

In a further aspect of the invention, an optical Raman amplifier for providing dynamic gain control of an amplified signal comprises:

an optical waveguide for transmitting a plurality of optical signals on channels at different wavelengths;

at least a first and a second Raman pump source having different wavelengths optically coupled to the optical waveguide for providing variable optical pump power to produce Raman gain for the optical signals;

an optical power monitor for measuring optical power of the amplified signals for monitoring changes in channel loading;

a pump controller for comparing the optical power of the amplified signal to a first and a second stored linear function, said linear functions correlating each of a first and second Raman pump power levels to total signal power in accordance with a pre-established Raman gain profile and gain level of the Raman amplifier in a fully loaded channel configuration, and for modifying the pump power of the first or second pump sources to correspond to a value of the first or second stored linear function in response to changes in channel loading.

Advantageously, in accordance with the present invention, a single photodiode can replace a costly and complex channel monitor for providing signal responsive pump control.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

When signal channels are dropped in a Raman amplified link, two effects take place that change the power (gain) levels of the remaining channels: 1) gain saturation of the Raman pumps, and 2) the Raman scattering among signal channels. If the signal output spectrum is somewhat flat when all the signal channels are fully loaded, the dropping of channels will result in higher powers per channel for the remaining channels as well as a negative tilt in the spectrum (ie. higher power at the shorter wavelength end). Adjustment of the powers of the Raman pumps is necessary to offset these changes. In the prior art, this is done in conjunction with a channel monitor which provides full spectral information of the signal channels.

Figure 1:
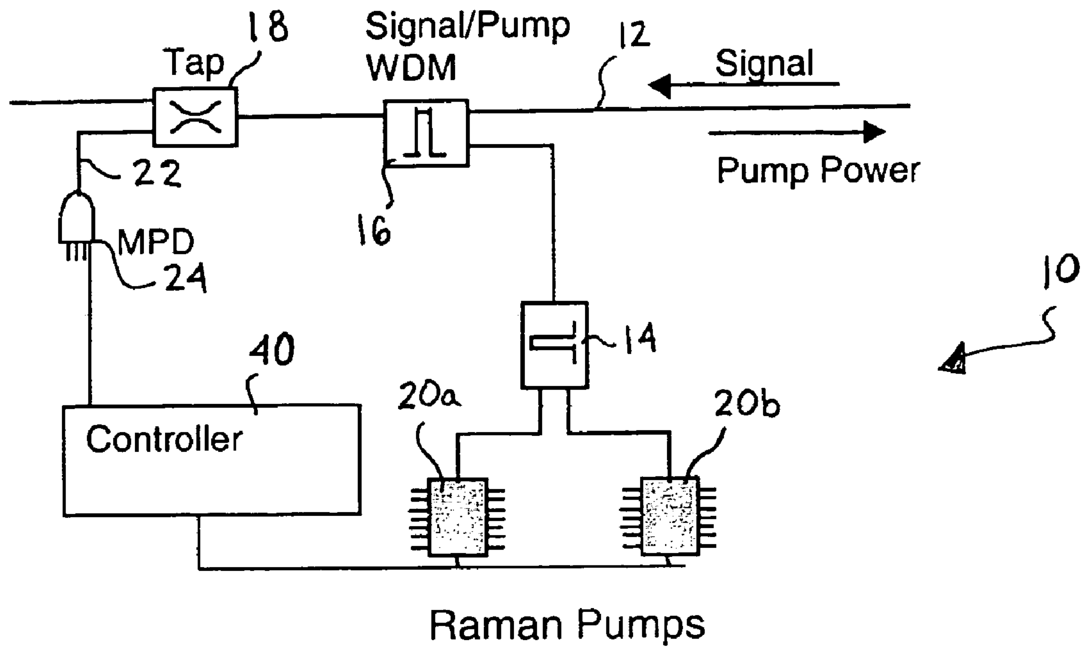
FIG. 1 is a schematic illustration of a distributed optical Raman amplifier.

A distributed Raman amplifier 10 is illustrated in FIG. 1, as an example system. Signal transmission is shown traveling from right to left in the figure on optical fiber 12. Pump power is counter-propagating from left to right from a plurality of pump sources 20. Pump sources 20*a* and 20*b* have different wavelengths, for example 1427 nm and 1457 nm. The pump outputs are combined in a WDM combiner 14. The pump signal is then combined in counter-propagating directions with the transmitted signal at WDM coupler 16. Pump signal is prevented by the WDM coupler from being transmitted with the signal beyond the coupler 16. Beyond pump coupler 16, the amplified signal is tapped, for example by a wavelength insensitive 2%:98% tap 18. The majority of the signal continues on fiber 12. The tapped portion is directed via optical fiber 22 to a monitor photodiode 24. A pump controller 40 is electrically coupled from the monitor photodiode 24 to the pumps 20*a*, 20*b* to provide feedback control.

Figure 2:
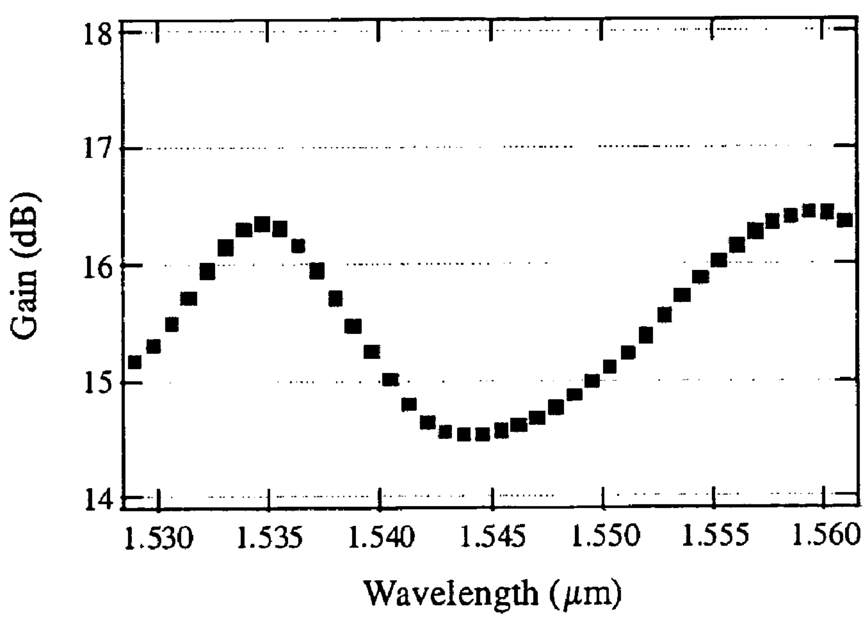
FIG. 2 illustrates a calculated Raman gain profile of a 40 channel C-band system in TrueWave RS fiber in a fully loaded channel configuration.

A signal may comprise, for example 40 channels. As the signal is transmitted through the network it will pass through routers, add/drop devices etc. which will change the relative strength of the different channel signals and the total number of channels. Each amplifier has a specific gain profile which can be characterized. FIG. 2 illustrates a calculated Raman gain profile of a 40 channel C-band system in TrueWave RS fiber. The system is fully loaded having a signal launch power of 3 dBm per channel at each channel. In order to maintain a desired substantially flat channel power output, the gain profile of the amplifier must be accorded in any gain control system.

FIG. 2 shows the calculated gain profile for the following example simulation:

- signal channel setup: 1529 nm~1562 nm, 40 channels, 100 GHz spacing
- signal launch power: 3 dBm per channel
- Fiber type: TrueWave RS, 100 km
- Raman pump wavelengths: 1427 nm, 1457 nm (counter-propagating)
- Startup Raman pump powers: 265 mW at 1427 nm, and 210 mW at 1457 nm, which produce roughly 15.5 dB of gain in the transmission fiber.

Figure 3:
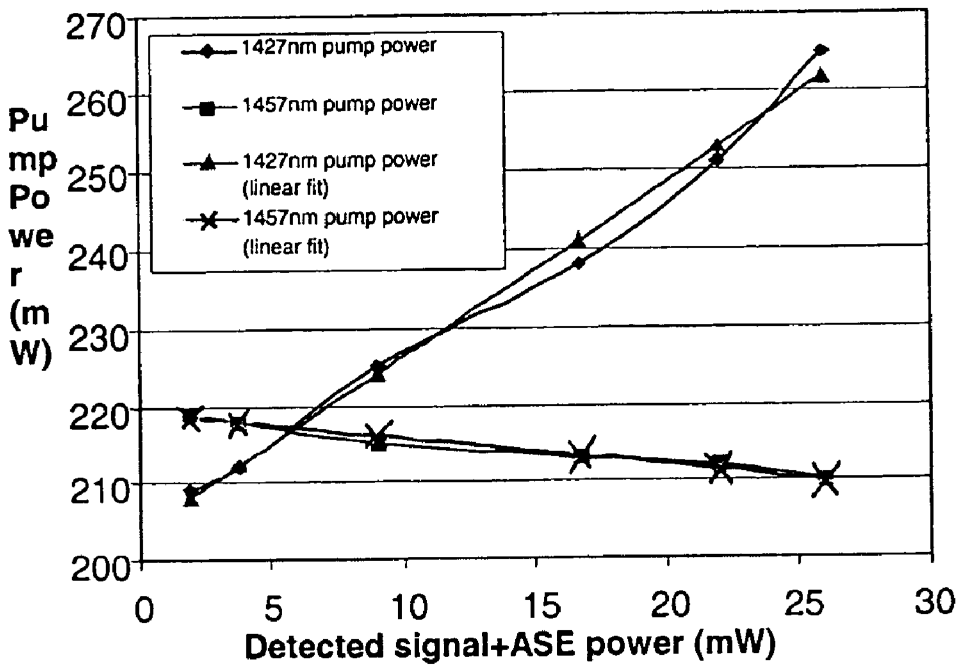
FIG. 3 is a graph of an example substantially linear function of pump power to total amplified signal power including ASE, illustrating the required pump powers to restore predetermined amplifier gain levels, such as the gain profile of FIG. 2.

The present invention has found that the relationship between the required pump powers, of each of the plurality of different wavelength pumps, and the amplified signal plus ASE is approximately linear. A calculated example is shown in FIG. 3. The relationship for $P\lambda_1$ at 1427 nm and $P\lambda_2$ at 1457 nm is approximately:

$$P\lambda_1 = 2.233P_s + 203.78$$

$$P\lambda_2 = -0.3506P_s + 219.14$$

where Ps is the detected signal plus ASE.

As can be seen in FIG. 3, as channels are dropped from the system, the shorter wavelength (1427 nm) pump power needs to be decreased and the longer wavelength (1457 nm)

pump power needs to be increased in order to maintain the original gain levels for the remaining channels. The required pump powers are found to scale in a roughly linear manner with the detected amplified signal power including amplified spontaneous emission (ASE).

FIGS. 4*a–d* through 9*a–c* are graphs showing the calculated signal gain deviation from the fully loaded case shown in FIG. 2 with and without pump power adjustment, when various signal channels are dropped. As can be seen, the pump control algorithm lowers the gain for the remaining channels in each case.

In order to obtain the approximate linear function for a given pump wavelength, a simulation or measurement is made of total signal power to input pump power while maintaining the desired gain profile and gain levels such as shown in FIG. 2 by adjusting the pump power. Total signal power unavoidably includes the amplified signal plus ASE. Pump power is not included in total signal power. This process is repeated (eg. using a search routine) for a plurality of data points at different total signal output powers, each time maintaining the same pre-established gain profile and gain levels and adjusting the pump power as necessary. The resultant graph, such as shown in FIG. 3, is extrapolated as a linear function for each pump wavelength. The resulting relationships are stored in the pump control memory for comparison to present pump levels and controlling any necessary adjustment.

Alternatively, the pump power versus signal power relationships are derived by the module processor (or an external computer) after the Raman gain coefficients of the transmission fiber are measured with integrated devices within the amplifier module. The Raman gain coefficients at different pump wavelengths can be measured by imposing a small signal modulation on the pump and measuring the resulting modulation amplitude on a probe signal channel. Alternatively, they can be measured by monitoring the back reflected ASE power as a function of the pump power.

Figure 10:
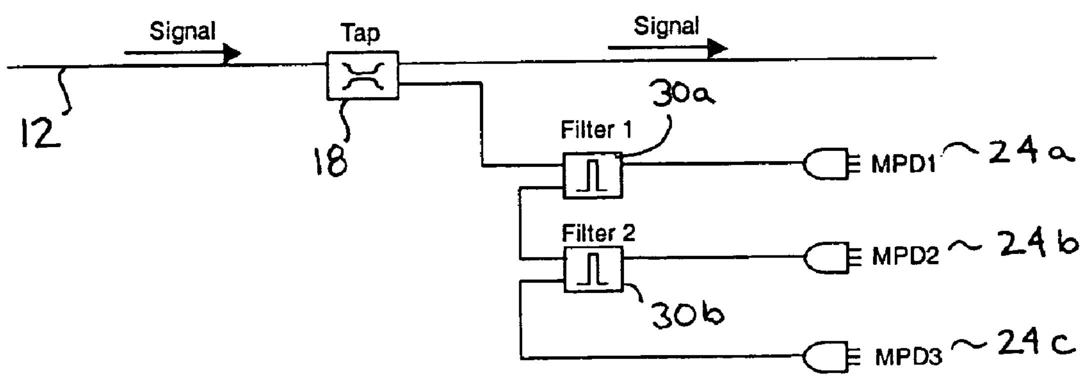
FIG. 10 is a schematic illustration of an alternate embodiment of the Raman amplifier of the present invention, adapted to provide a plurality of channel band monitors in order to refine the gain control sensitivity.
Figure 4:
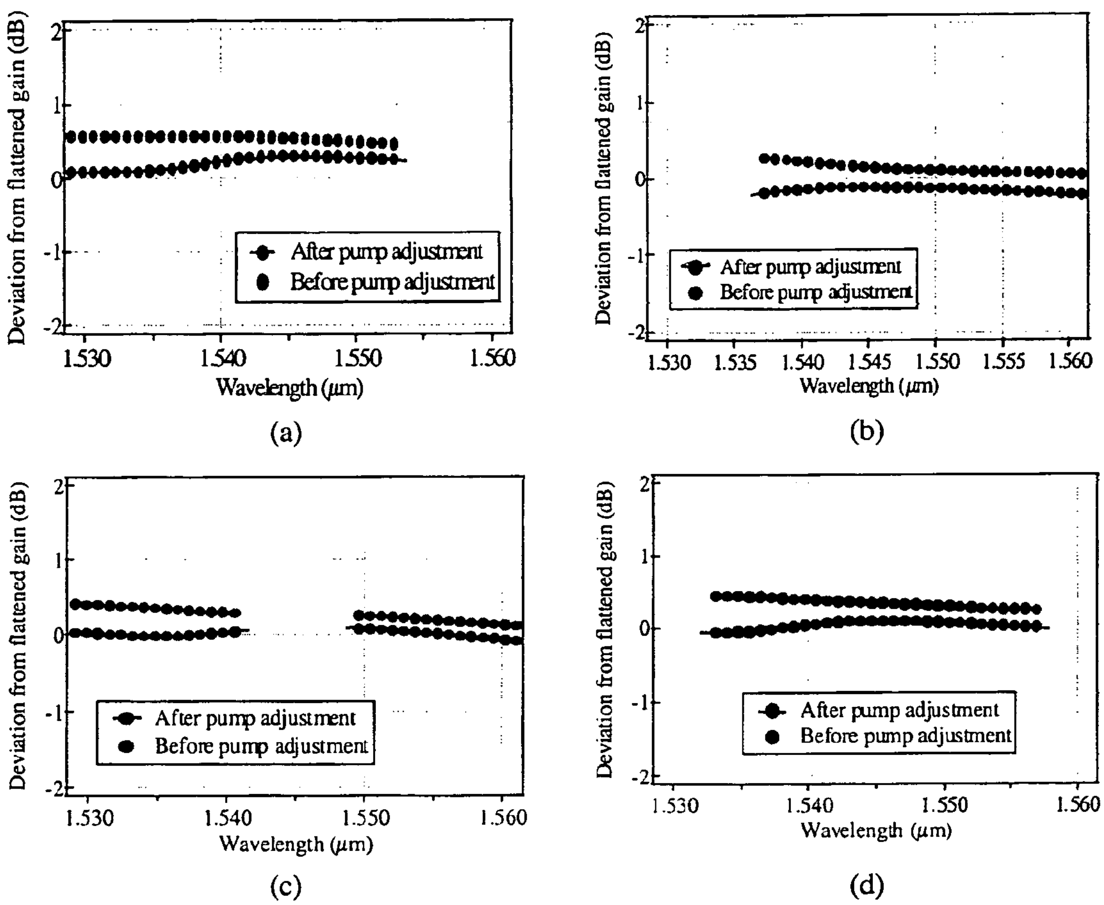
FIGS. 4*a–d* are graphs showing the calculated signal gain deviation from the fully loaded case shown in FIG. 2 with and without pump power adjustment, when 10 of the 40 channels are dropped.
Figure 5:
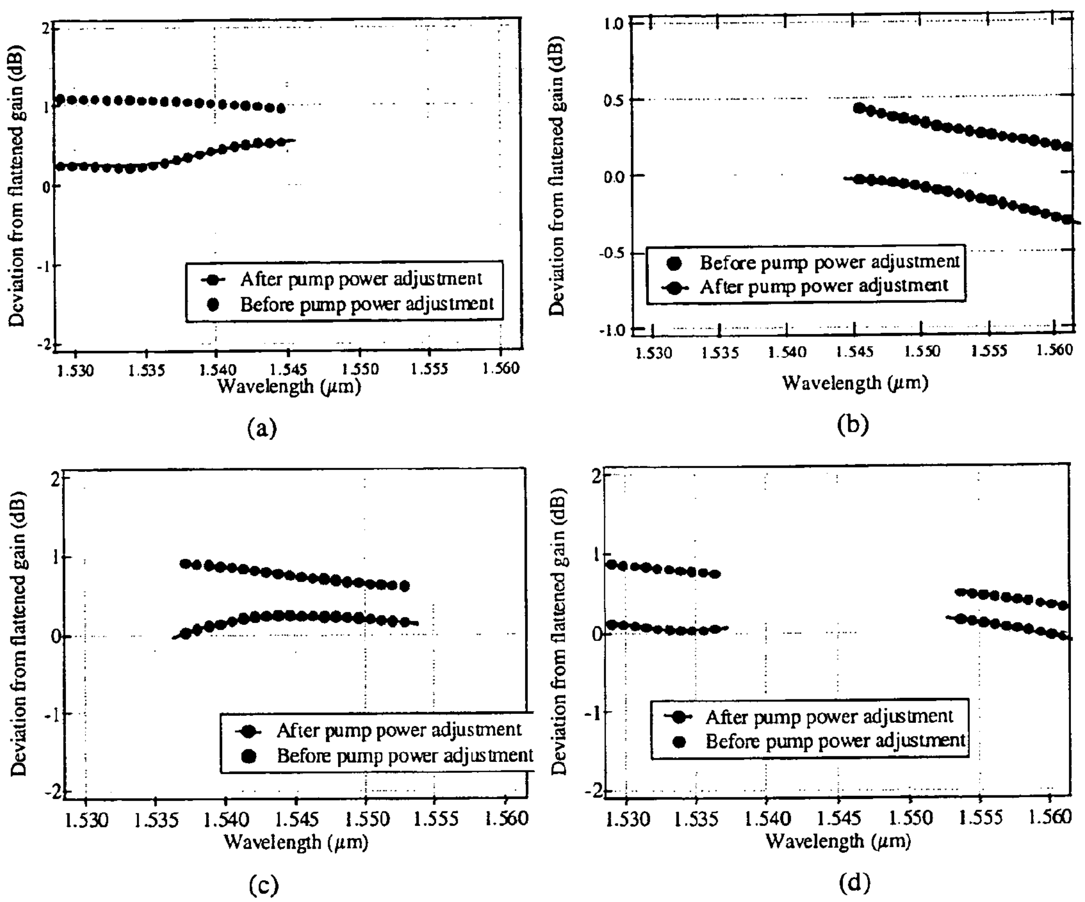
FIGS. 5*a–d* are graphs showing the pump power adjustment for an example where 20 of the 40 channels are dropped.
Figure 6:
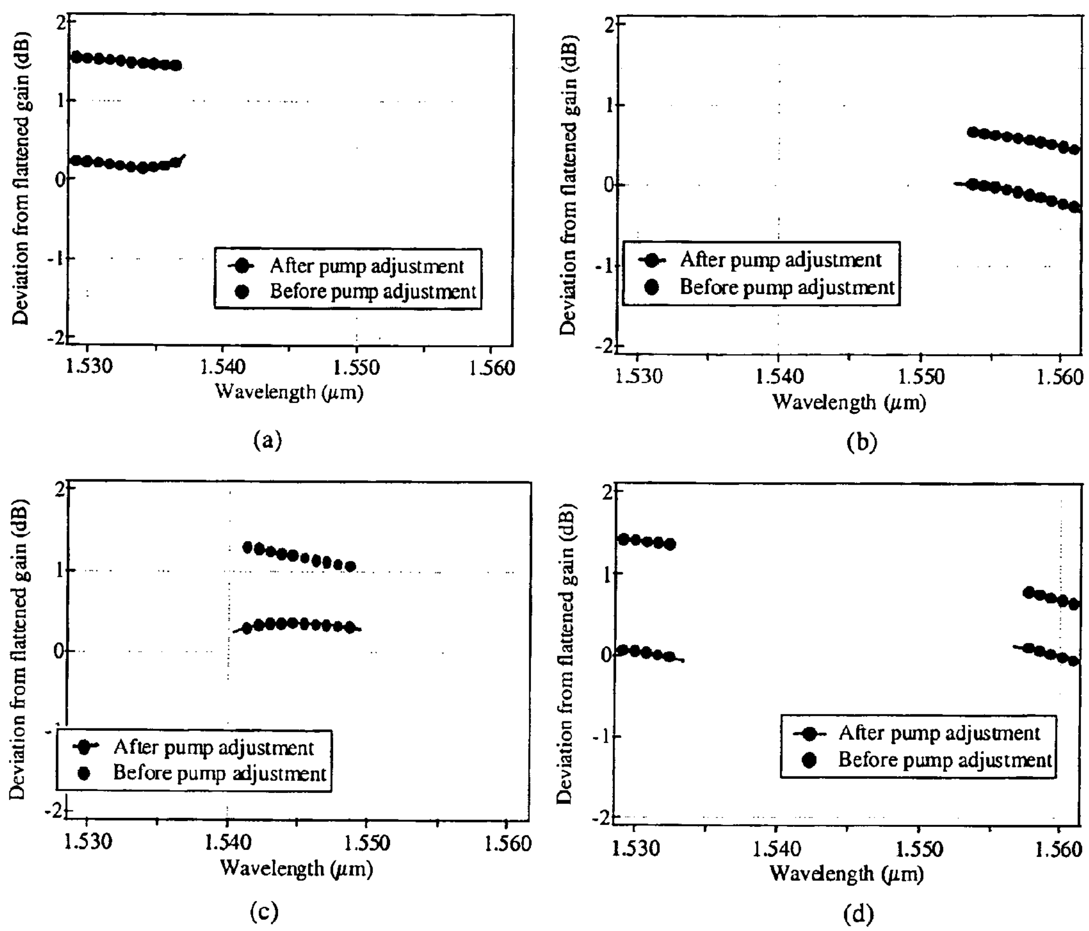
FIGS. 6*a–d* are graphs showing the pump power adjustment for an example where 30 of the 40 channels are dropped.
Figure 7:
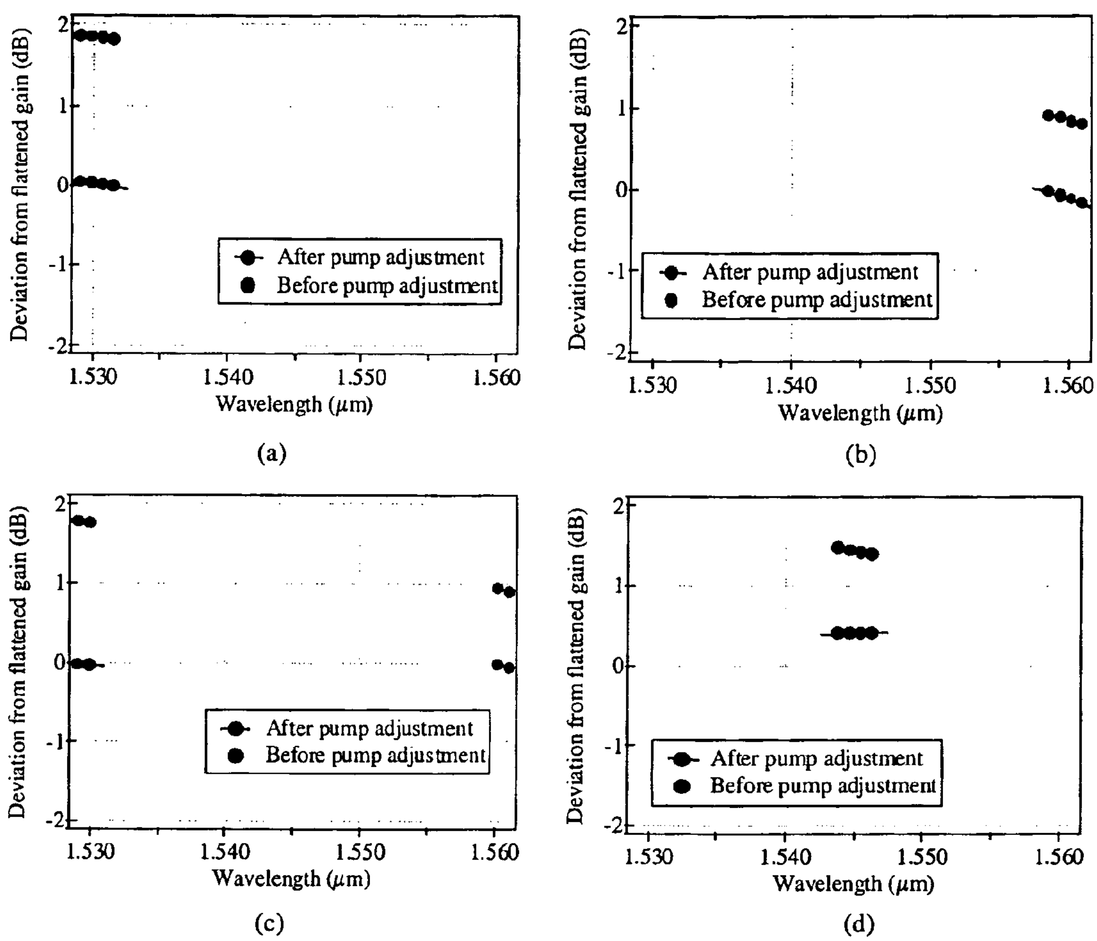
FIGS. 7*a–d* are graphs showing the pump power adjustment for an example where 36 of the 40 channels are dropped.
Figure 8:
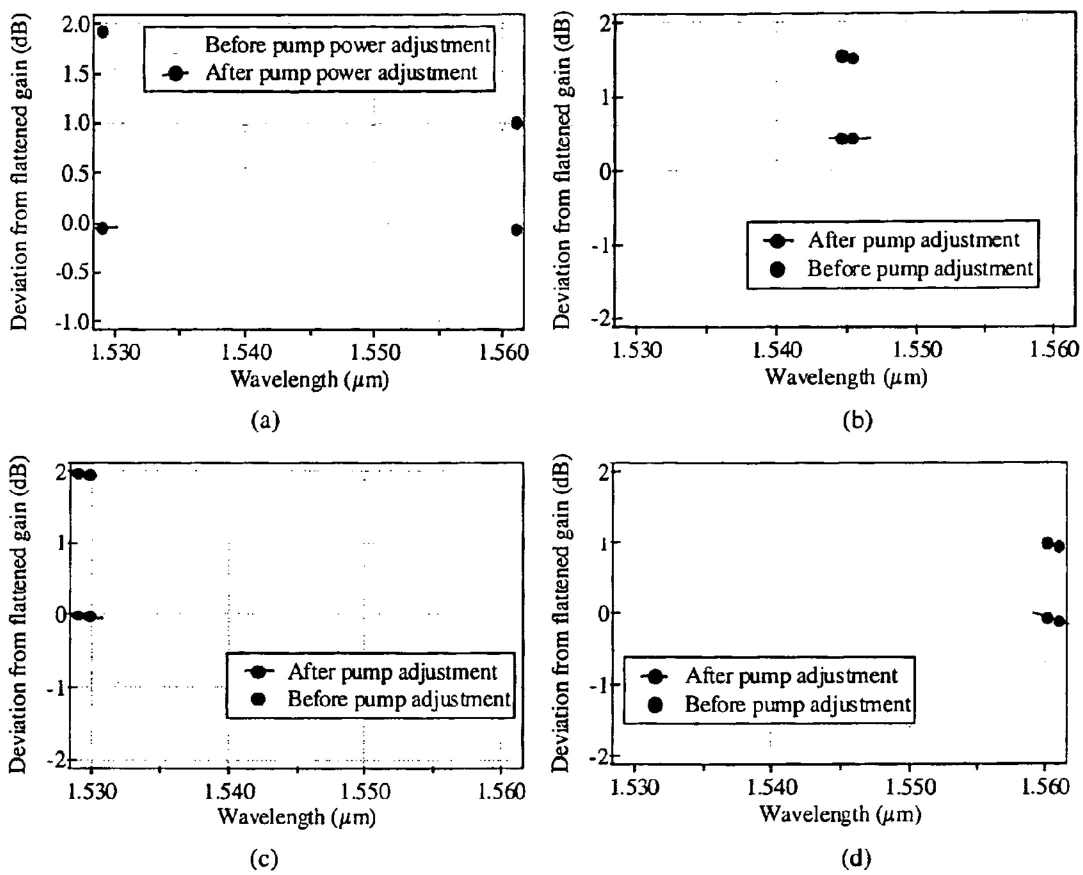
FIGS. 8*a–d* are graphs showing the pump power adjustment for an example where 38 of the 40 channels are dropped.
Figure 9:
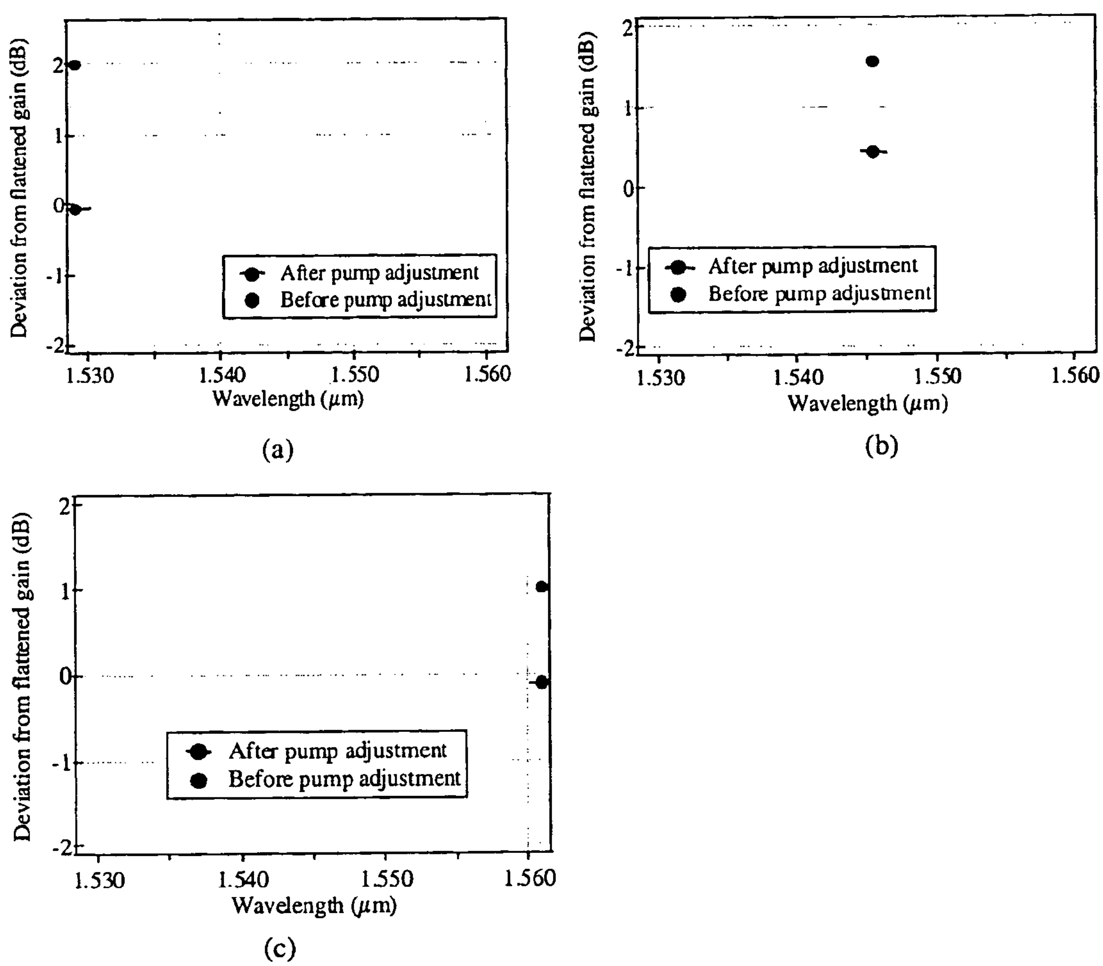
FIGS. 9*a–c* are graphs showing the pump power adjustment for an example where 39 of the 40 channels are dropped.

The accuracy of the algorithm can be improved by the use of additional monitor photodiodes and filters, which provide more detailed information on the spectral distribution of the remaining channels. One possible implementation is shown in FIG. 10. The signal that is tapped off fiber 12 at tap 18 is split into three branches using two bandpass filters 30*a* and 30*b*, which divide the signal into wavelength regions. Light from the short wavelength band is directed to the monitor photodiode 1, 24*a*. Light in the middle wavelength band is directed to the monitor photodiode 2, 24*b*. And light in the long wavelength band is directed to monitor photodiode 3, 24*c*. In this case, instead of total signal plus ASE power, the gain control algorithm can be based on a weighted sum of the three MPD responses.

Although the specification describes the implementation of automatic gain control in a case with two pump wavelengths, this method can be extended to cases where there are more than two Raman pumps at different pump wavelengths.

The embodiments of the invention described above are intended to be exemplary only. The scope of the invention is therefore intended to be limited solely by the scope of the appended claims.

What is claimed is:

1. A method for providing dynamic gain control of an optical Raman amplifier in an optical communications link comprising an optical waveguide for transmitting optical signals on channels at different wavelengths, the optical Raman amplifier including at least a first optical pump source of a first pump wavelength and a second optical pump source of a second different wavelength, said pumps optically coupled to provide optical energy to the optical waveguide of sufficient pump powers to cause stimulated Raman scattering for amplifying optical signals, and a pump controller for controlling the pump powers of the at least first and second optical pumps in response to data from an optical signal detector at the output of the amplifier, comprising the steps of:

a) characterizing a gain profile and gain level of the Raman amplifier when the channels of the communications link are fully loaded, over a wavelength spectrum at least as great as a desired transmission channel spectrum;

b) pre-establishing a set of pump power values and signal level values required to maintain the characterized gain profile and gain levels for a plurality of channel loading configurations for the at least first and second pump wavelengths;

c) deriving linear functions from the set of pre-established values for each of the at least first and second pump wavelengths;

d) tapping a portion of an amplified signal;

e) detecting a total amplified signal power from the tapped portion of the amplified signal;

f) calculating the required first and second pump powers to maintain the characterized gain profile and gain level as a unique solution from the linear functions; and g) providing the calculated pump powers for the first and second pumps to a pump controller for comparing the calculated pump powers to current pump powers and varying the pump powers if necessary.

2. The method as defined in claim 1, wherein the set of pump power values required to maintain the characterized gain profile and gain levels for a plurality of channel loading configurations for the first and second pump wavelengths are pre-established by integrated measurement devices within the amplifier.

3. The method as defined in claim 1, wherein the set of pump power values required to maintain the characterized gain profile and gain levels for a plurality of channel loading configurations for the first and second pump wavelengths are calculated using the appropriate Raman gain coefficients of the optical waveguide, which are measured by imposing a signal modulation on each pump power and measuring a resulting modulation amplitude on a probe signal channel.

4. The method as defined in claim 1, wherein the set of pump power values and signal level values required to maintain the characterized gain profile and gain levels for a plurality of channel loading configurations for the first and second pump wavelengths are calculated using the appropriate Raman gain coefficients of the optical waveguide, which are measured by monitoring a back reflected amplified spontaneous emission power as a function of pump power for each of the first and second pump wavelengths.

5. The method as defined in claim 1, wherein tapping a portion of an amplified signal further includes dividing the tapped amplified signal into a plurality of wavelength bands, and subsequently detecting a total amplified signal power of each wavelength band.

6. The method as defined in claim 5 wherein detecting a total amplified signal power from the tapped portion of the amplified signal, and calculating the required first and second pump powers to maintain the characterized gain profile and gain level as a unique solution from the linear functions is based on a weighted sum of the plurality of tapped amplified wavelength bands.

7. An optical Raman amplifier for providing dynamic gain control of an amplified signal comprising an optical waveguide for transmitting a plurality of optical signals on channels at different wavelengths;

at least a first and a second Raman pump source having different wavelengths optically coupled to the optical waveguide for providing variable optical pump power to produce Raman gain for the optical signals;

an optical power monitor at the output of the amplifier for measuring optical power of the amplified signals which changes as a result of changes in channel loading;

a pump controller for comparing the optical power of the amplified signal to a first and a second stored linear function, said linear functions correlating each of a first and second Raman pump power levels to total amplified signal power in accordance with a pre-established Raman gain profile and gain level of the Raman amplifier in a fully loaded channel configuration, and for modifying the pump power of the first or second pump sources to correspond to a value of the first or second stored linear function in response to changes in channel loading.

8. The optical Raman amplifier defined in claim 7, wherein the first and second stored linear functions are obtained by pre-establishing a set of pump power values and signal level values required to maintain the pre-established gain profile and gain levels for a plurality of channel loading configurations for each of the first and the second pump wavelengths, and deriving a linear function from the set of pre-established values for the first and second pump wavelengths.

9. The optical Raman amplifier defined in claim 7, wherein the optical power monitor comprises a photo-diode.

10. The optical Raman amplifier defined in claim 7, wherein the optical power monitor comprises a plurality of photodiodes and associated means for directing only a wavelength band portion of the amplified signal to each of the plurality of photodiodes.

11. The optical Raman amplifier defined in claim 10, wherein the means for directing only a wavelength band portion of the amplified signal comprise a plurality of wavelength filters for directing wavelength band portions of the amplified signal to associated photodiodes of the plurality of photodiodes.

12. The optical Raman amplifier defined in claim 11, wherein the pump controller for comparing the optical power of the amplified signal to a first and a second stored linear function, compares a weighted average of the optical power of the amplified signal from the plurality of photodiodes.

13. The optical Raman amplifier defined in claim 7, wherein the amplifier is a distributed Raman amplifier.

14. The optical Raman amplifier defined in claim 7, wherein the amplifier is a discrete Raman amplifier.

15. The optical Reman amplifier defined in claim 13, wherein the at least first and second Raman pump sources are optically coupled to the optical waveguide for providing counter-propagating pump energy.

16. An optical Raman amplifier for providing dynamic gain control of an amplified signal comprising an optical waveguide for transmitting a plurality of optical signals on channels at different wavelengths;

at least a first and a second Raman pump source having different wavelengths optically coupled to the optical waveguide for providing variable optical pump power to produce Raman gain for the optical signals;

an optical power monitor at the output of the amplifier for measuring optical power of the amplified signals which changes as a result of changes in channel loading;

a pump controller for comparing the optical power of the amplified signal to stored values correlating pump power levels of the first and second pump sources to total amplified signal power in accordance with a pre-established Raman gain profile and gain level of the Raman amplifier in a fully loaded channel configuration, and for modifying the pump power of the first or second pump sources to correspond to a stored value in response to changes in channel loading.

* * * * *